(12) United States Patent
Erni

(10) Patent No.: US 10,698,375 B2
(45) Date of Patent: *Jun. 30, 2020

(54) APPARATUS TO COMMUNICATIVELY COUPLE THREE-WIRE FIELD DEVICES TO CONTROLLERS IN A PROCESS CONTROL SYSTEM

(71) Applicant: Fisher-Rosemount Systems, Inc., Round Rock, TX (US)

(72) Inventor: Klaus Erni, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/953,180

(22) Filed: Apr. 13, 2018

(65) Prior Publication Data
US 2018/0231945 A1   Aug. 16, 2018

Related U.S. Application Data

(63) Continuation of application No. 14/609,801, filed on Jan. 30, 2015, now Pat. No. 9,946,240.

(51) Int. Cl.
G05B 19/042 (2006.01)
H04L 12/413 (2006.01)

(52) U.S. Cl.
CPC .......... *G05B 19/042* (2013.01); *H04L 12/413* (2013.01)

(58) Field of Classification Search
CPC .......................... G05B 19/042; H04L 12/413
See application file for complete search history.

(56) References Cited

U.S. PATENT DOCUMENTS

| 3,886,352 | A  | 5/1975  | Lai |
| 5,465,298 | A  | 11/1995 | Wilkison et al. |
| 5,629,831 | A  | 5/1997  | Eggert et al. |
| 8,332,567 | B2 | 12/2012 | Burr et al. |
| 8,762,618 | B2 | 6/2014  | Burr et al. |

(Continued)

FOREIGN PATENT DOCUMENTS

| CN | 101685306 A | 3/2010 |
| EP | 2913896     | 9/2015 |

(Continued)

OTHER PUBLICATIONS

Intellectual Property Office of Great Britain, "Search Report," issued in connection with GB Application No. GB1600283.4, dated Jul. 5, 2016, 5 pages.

(Continued)

*Primary Examiner* — Nimesh G Patel
(74) *Attorney, Agent, or Firm* — Hanley, Flight & Zimmerman, LLC

(57) ABSTRACT

Example apparatus to communicatively couple three-wire field devices to controllers in a process control system are disclosed. An example terminal block is disclosed that includes a first interface including termination points to couple with a field device, a second interface to couple with a shared bus of a termination panel, wherein the shared bus is to remain coupled to a controller when the terminal block is removed, a third interface to couple with a power bus of the termination panel, and a fuse disposed between the first interface and the third interface.

20 Claims, 5 Drawing Sheets

(56) References Cited

U.S. PATENT DOCUMENTS

| | | | |
|---|---|---|---|
| 9,411,769 | B2 | 8/2016 | Erni et al. |
| 9,495,313 | B2 | 11/2016 | Burr et al. |
| 2006/0031618 | A1 | 2/2006 | Hansquine et al. |
| 2011/0121649 | A1 | 5/2011 | Loldj et al. |
| 2012/0043830 | A1 | 2/2012 | Wehrle et al. |
| 2015/0244107 | A1* | 8/2015 | Lostoski ............... H01R 9/2408 439/352 |
| 2015/0280754 | A1* | 10/2015 | Larson ................. G01D 11/245 375/295 |
| 2015/0355245 | A1 | 12/2015 | Ordanis |
| 2016/0226162 | A1 | 8/2016 | Erni |

FOREIGN PATENT DOCUMENTS

| | | |
|---|---|---|
| JP | 2002023811 A | 1/2002 |
| JP | 2002233049 A | 8/2002 |

OTHER PUBLICATIONS

Emerson Process Management, "S-series Electronic Marshalling," DeltaV Product Data Sheet, Oct. 2014, 43 pages.

Blevins, "Providing 24VDC to Field Devices," retrieved from ,http://modelingandcontrol.com/2014/05/update-providing-24vdc-to-field-devices/>, on Nov. 19, 2014, 4 pages.

Blevins, "Update-Providing 24VDC to Field Devices," retrieved from ,http://modelingandcontrol.com/2014/05/update-providing-24vdc-to-field-devices/>, on Nov. 19, 2014, 4 pages.

United States Patent and Trademark Office, "Notice of Allowance," issued in connection with U.S. Appl. No. 14/609,801, dated Dec. 11, 2017, 9 pages.

United States Patent and Trademark Office, "Final Office Action," issued in connection with U.S. Appl. No. 14/609,801, dated Sep. 18, 2017, 11 pages.

United States Patent and Trademark Office, "Non-final Office Action," issued in connection with U.S. Appl. No. 14/609,801, dated Apr. 6, 2017, 8 pages.

Japanese Patent Office, "Notice of Reasons for Rejection", issued in connection with Japanese Patent Application No. 2016-007660, dated Jan. 28, 2020 (6 pages).

China National Intellectual Property Administration, "Notification of Second Office Action", issued in connection with Chinese Patent Application No. 201610055192.5, dated Mar. 2, 2020, (10 pages).

* cited by examiner

APPARATUS TO COMMUNICATIVELY COUPLE THREE-WIRE FIELD DEVICES TO CONTROLLERS IN A PROCESS CONTROL SYSTEM

RELATED APPLICATION

This patent arises from a continuation of U.S. patent application Ser. No. 14/609,801, which was filed on Jan. 30, 2015. U.S. patent application Ser. No. 14/609,801 is hereby incorporated herein by reference in its entirety. Priority to U.S. patent application Ser. No. 14/609,801 is hereby claimed.

FIELD OF THE DISCLOSURE

The present disclosure relates generally to process control systems and, more particularly, to apparatus to communicatively couple three-wire field devices to controllers in a process control system.

BACKGROUND

Process control systems, like those used in chemical, petroleum, pharmaceutical, pulp and paper, or other manufacturing processes, typically include one or more process controllers communicatively coupled to at least one host including at least one operator workstation and to one or more field devices configured to communicate via analog, digital or combined analog/digital communication protocols. The field devices, which may be, for example, device controllers, valves, valve actuators, valve positioners, switches and transmitters (e.g., temperature, pressure, flow rate, and chemical composition sensors) or combinations thereof, perform functions within the process control system such as opening or closing valves and measuring or inferring process parameters. A process controller receives signals indicative of process measurements made by the field devices and/or other information pertaining to the field devices, uses this information to implement a control routine, and generates control signals that are sent over the buses or other communication lines to the field devices to control the operation of the process control system.

A process control system can include a plurality of field devices that provide several different functional capabilities and that are often communicatively coupled to process controllers using two-wire interfaces in a point-to-point (e.g., one field device communicatively coupled to a field device bus) or a multi-drop (e.g., a plurality of field devices communicatively coupled to a field device bus) wiring connection arrangements or with wireless communications. Some field devices are configured to operate using relatively simple commands and/or communications (e.g., an ON command and an OFF command). Other field devices are more complex requiring more commands and/or more communication information, which may or may not include simple commands. For example, more complex field devices may communicate analog values with digital communications superimposed on the analog value using, for example, a Highway Addressable Remote Transducer ("HART") communication protocol. Other field devices can use entirely digital communications (e.g., a FOUNDATION Fieldbus communication protocol).

Some field devices (e.g., photoelectric or capacitive sensors) are implemented using a three-wire architecture to enable communications as well as to provide power to such devices. Typically, such three-wire field devices are coupled to an external power source (and associated external fuse) to power the device in addition to being coupled to one or more I/O cards.

SUMMARY

Example apparatus to communicatively couple three-wire field devices to controllers in a process control system are disclosed. An example terminal block is disclosed that includes a first interface including termination points to couple with a field device, a second interface to couple with a shared bus of a termination panel, wherein the shared bus is to remain coupled to a controller when the terminal block is removed, a third interface to couple with a power bus of the termination panel, and a fuse disposed between the first interface and the third interface.

An example termination panel is disclosed that includes a shared bus, a power bus, a plurality of terminal blocks to couple with a controller via the shared bus, at least a first one of the terminal blocks including a first interface including termination points to couple with a field device, a second interface to couple with the shared bus, wherein the shared bus is to remain coupled with the controller when the first one of the terminal blocks is removed, a third interface to couple with the power bus, and a fuse disposed between the first interface and the third interface.

An example process control system is disclosed that includes a controller, a termination panel including a shared bus and a power bus, the termination panel including a plurality of terminal blocks coupled to the termination panel to couple with the controller via the shared bus, at least a first one of the terminal blocks including a first interface including termination points to couple with a field device, a second interface to couple with the shared bus, wherein the shared bus is to remain coupled with the controller when the first one of the terminal blocks is removed, a third interface to couple with the power bus, and a fuse disposed between the first interface and the third interface.

DETAILED DESCRIPTION

Although the following describes example apparatus and systems including, among other components, software and/ or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example apparatus and systems, persons of ordinary skill in the art will readily appreciate that the examples provided are not the only way to implement such apparatus and systems.

Figure 1:
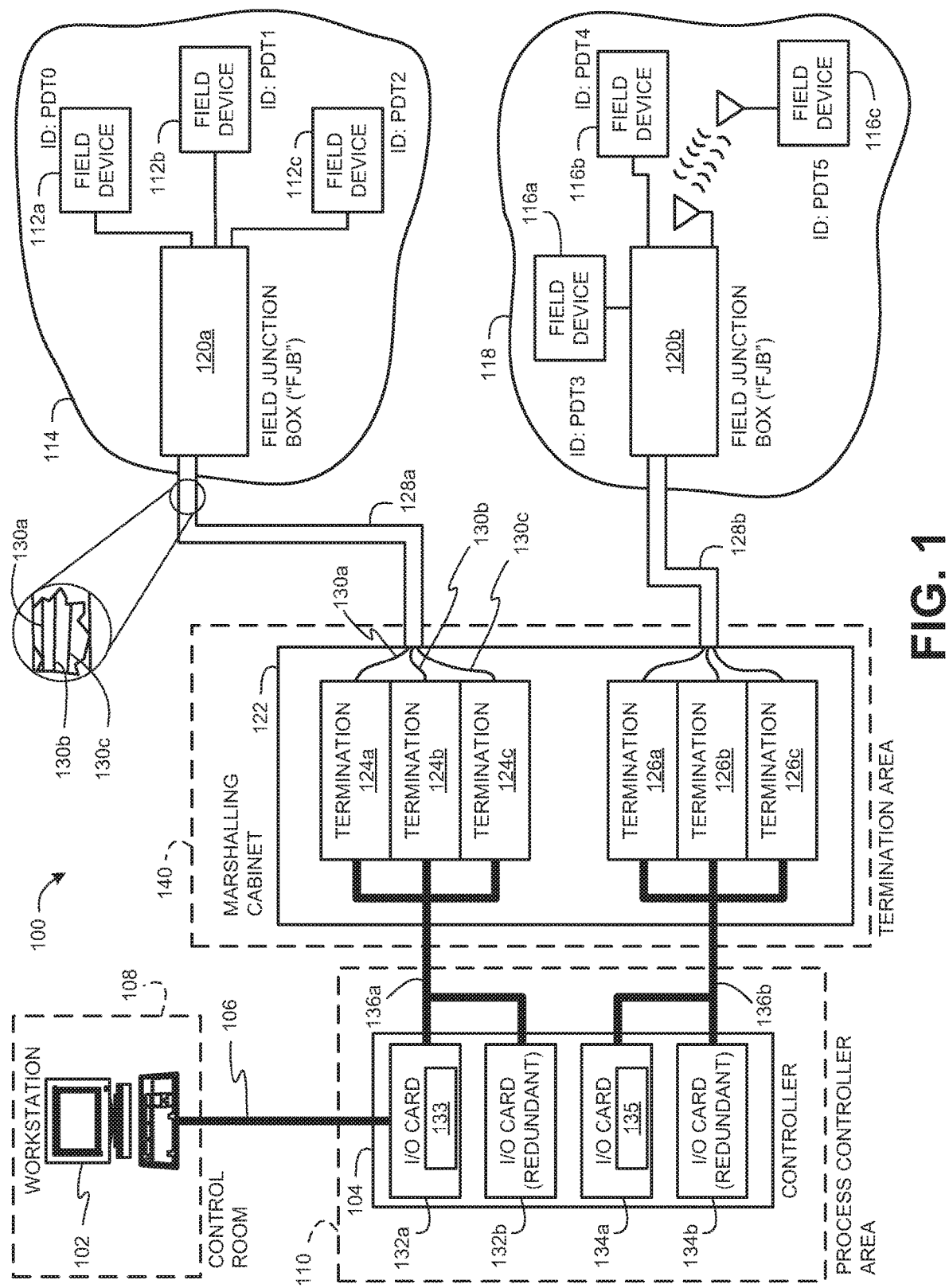
FIG. 1 is a block diagram illustrating an example process control system.

An example process control system includes a control room (e.g., a control room 108 of FIG. 1), a process controller area (e.g. a process controller area 110 of FIG. 1), a termination area (e.g., a termination area 140 of FIG. 1), and one or more process areas (e.g., process areas 114 and 118 of FIG. 1). A process area includes a plurality of field devices that perform operations (e.g., controlling valves, controlling motors, controlling boilers, monitoring, measuring parameters, etc.) associated with performing a particular process (e.g., a chemical process, a petroleum process, a pharmaceutical process, a pulp and paper process, etc.). Some process areas are not accessible by humans due to harsh environment conditions (e.g., relatively high temperatures, airborne toxins, unsafe radiation levels, etc.). The control room typically includes one or more workstations within an environment that is safely accessible by humans. The workstations include user applications that users (e.g., engineers, operators, etc.) can access to control operations of the process control system by, for example, changing variable values, process control functions, etc. The process control area includes one or more controllers communicatively coupled to the workstation(s) in the control room. The controllers automate control of the field devices in the process area by executing process control strategies implemented via the workstation. An example process strategy involves measuring a pressure using a pressure sensor field device and automatically sending a command to a valve positioner to open or close a flow valve based on the pressure measurement. The termination area includes a marshalling cabinet that enables the controllers to communicate with the field devices in the process area. In particular, the marshalling cabinet includes a plurality of termination modules used to marshal, organize, or route signals from the field devices to one or more I/O cards communicatively coupled to the controllers. The I/O cards translate information received from the field devices to a format compatible with the controllers and translate information from the controllers to a format compatible with the field devices.

Known techniques used to communicatively couple field devices within a process control system to controllers involve using a separate bus (e.g., a wire, a cable, or a circuit) between each field device and a respective I/O card communicatively coupled to a controller (e.g., a process controller, a programmable logic controller, etc.). An I/O card enables communicatively coupling a controller to a plurality of field devices associated with different data types or signal types (e.g., analog in (AI) data types, analog out (AO) data types, discrete in (DI) data types, discrete out (DO) data types, digital in data types, and digital out data types)) and different field device communication protocols by translating or converting information communicated between the controller and the field devices. For example, an I/O card may be provided with one or more field device interfaces configured to exchange information with a field device using the field device communication protocol associated with that field device. Different field device interfaces communicate via different channel types (e.g., analog in (AI) channel types, analog out (AO) channel types, discrete in (DI) channel types, discrete out (DO) channel types, digital in channel types, and digital out channel types)). In addition, the I/O card can convert information (e.g., voltage levels) received from the field device into information (e.g., pressure measurement values) that the controller can use to perform operations associated with controlling the field device. The known techniques require a bundle of wires or buses (e.g., a multi-core cable) to communicatively couple a plurality of field devices to I/O cards.

Unlike these known techniques that use a separate bus to communicatively couple each field device to corresponding I/O cards, some known apparatus and methods communicatively couple field devices to an I/O card by terminating a plurality of field devices at a termination panel (e.g., a marshalling cabinet) and using one bus (e.g., a conductive communication medium, an optical communication medium, a wireless communication medium) communicatively coupled between the termination panel and the I/O card to communicatively couple the field devices to the I/O card. Such apparatus and methods are disclosed in U.S. Pat. No. 8,332,567, filed on Sep. 19, 2006; U.S. Pat. No. 8,762,618, filed on Dec. 10, 2012; U.S. Pat. No. 9,495,313, filed on Jan. 31, 2014; and U.S. Pat. No. 9,411,769, filed on Jan. 8, 2015; all of which are hereby incorporated by reference in their entireties. In brief, such techniques involve using an example universal I/O bus (e.g., a common or shared communication bus) that communicatively couples a plurality of termination modules to one or more I/O cards communicatively coupled to a controller. Each termination module is communicatively coupled to one or more respective field devices using a respective field device bus (e.g., an analog bus or a digital bus) from each field device that terminates on a terminal block that is communicatively coupled with a corresponding termination module. In some examples, the termination modules are CHARMs (characterization modules) developed by Emerson Process Management. The termination modules are configured to receive field device information from the field devices via the field device buses and communicate the field device information to the I/O cards via the universal I/O bus by, for example, packetizing the field device information and communicating the packetized information to the I/O cards via the universal I/O bus. The I/O card(s) can extract the field device information received via the universal I/O bus and communicate the field device information to the controller, which can then communicate some or all of the information to one or more workstation terminals for subsequent analysis. Likewise, the I/O cards can packetize the field device information from workstation terminals and communicate the packetized field device information to the plurality of termination modules via the universal I/O bus. Each of the termination modules can then extract or depacketize respective field device information from the packetized communications received from a respective I/O card and communicate the field device information to a respective field device.

Each of the termination modules may be coupled to a different type of field device that communicates using a different communication protocol. As such, in addition to relaying information between the I/O cards and the field devices, the termination modules communicate with the corresponding field devices using a first communication protocol associated with the field device and communication with the I/O cards based on a second protocol associated with the universal I/O bus. Thus, while different termination modules may use different communication protocols to communicate with particular field devices, all of the termination modules use the same communication protocol to communicate with the I/O cards. In this manner, the communications back to the controller are significantly simplified.

Communications with many field devices in a process control system are implemented using a two-wire architecture. For example, in a 2-wire discrete input (DI) field device, one wire is used to feed (e.g., power and/or apply an electrical signal to) a contact input of the field device and cause current to flow when the contact is closed. The second wire in a 2-wire DI field device is used for the output signal of the field device that serves as the input to the process control system (e.g., provides feedback indicating whether the contact is open or closed). Known terminal blocks provide interfaces to directly couple each of the two-wires to a controller in a process control system and/or a termination module as described above which, in turn, communicates with a controller.

By contrast, some field devices are 3-wire field devices that have three wires to enable communications and provide power to the field device to operate. For example, in a 3-wire DI field device, a first wire is used to feed (e.g., power and/or apply an electrical signal to) the field device and the contact input. A second wire of a 3-wire DI field device is used specifically to power the field device. A third wire is used for the output signal of the field device that serves as the input to the process control system. While there are known terminal blocks that can be communicatively coupled directly with a 2-wire field device, there are no terminal blocks that can be communicatively coupled with a 3-wire DI field device without additional components and complexity. For example, a 3-wire field device may be wired to a known termination module for purposes of communications via a known terminal (2-wire) block but the field device must also be wired to an external power source to power the device. Such wiring can involve as many as five external wire terminals in addition to the two used to connect wires to the terminal block. That is, there are two wire terminals associated with the terminal block, an additional two terminals associated with the external power source, and three more terminals to enable the coupling of each of the three wires of the field device with the terminal block and the external power source. Furthermore, adding an external power source in this manner also requires the use of an external fuse between the external power source and the 3-wire field device to protect against a short circuit as the power source is not typically energy limited. These additional components and wiring requirements result in increased cost and complexity to implement a 3-wire field device. Some known systems employ specially manufactured terminal blocks to facilitate the wiring of such 3-wire field devices. However, when an engineer or other plant personnel desires to change the signal sensing components attached to such a terminal block (e.g., the DI electronics), the terminal block and all the associated wiring needs to be undone and/or removed. Furthermore, known terminal blocks for 3-wire DI field devices do not include a fuse such that additional components are still required.

The example terminal blocks constructed in accordance with the teachings disclosed herein overcome the above complexities to facilitate the direct coupling of 3-wire field devices to a process control system. In some examples, the terminal blocks disclosed herein include three wire terminals on which each of the three wires of a 3-wire DI field device may be landed to directly couple the field devices to the corresponding termination modules. In some examples, the terminal blocks are communicatively coupled to an external power source to provide power to each of the termination modules to provide the necessary power to the corresponding 3-wire field devices. That is, in some examples, the need to separately couple each 3-wire field device to an external power source is avoided because the terminal blocks provide an interface between the power source and the field devices. Further, in some examples, a fuse is built into the terminal blocks disclosed herein to provide surge protection without the need for a separate external fuse. In some such examples, the fuse is replaceable. In some examples, the terminal blocks disclosed herein enable the replacement or changing of termination modules containing the signal sensing components (e.g., the DI electronics contained within the corresponding termination modules) without removing the terminal blocks and/or without unwiring the corresponding field devices to the terminal blocks. As a result, the initial wiring, maintenance, and/or updating of wiring for 3-wire DI field devices is substantially simplified with fewer components to save both time and money and reduce an overall footprint of the system.

Now turning to FIG. 1, an example process control system 100 is shown implemented according to the teachings of U.S. Pat. No. 8,332,567. The example process control system of 100 includes a workstation 102 communicatively coupled to a controller 104 via a bus or local area network (LAN) 106, which is commonly referred to as an application control network (ACN). The LAN 106 may be implemented using any desired communication medium and protocol. For example, the LAN 106 may be based on a hardwired or wireless Ethernet communication protocol. However, any other suitable wired or wireless communication medium and protocol could be used. The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 104 to communicate with other devices or systems using any desired communication media (e.g., wireless, hardwired, etc.) and protocols (e.g., HTTP, SOAP, etc.). The controller 104 may be configured to perform one or more process control routines or functions that have been generated by a system engineer or other system operator using, for example, the workstation 102 or any other workstation and which have been downloaded to and instantiated in the controller 104. In the illustrated example, the workstation 102 is located in a control room 108 and the controller 104 is located in a process controller area 110 separate from the control room 108.

In the illustrated example, the example process control system 100 includes field devices 112*a-c* in a first process area 114 and field devices 116*a-c* in a second process control area 118. To communicate information between the controller 104 and the field devices 112*a-c* and 116*a-c*, the example process control system 100 is provided with field junction boxes (FJB's) 120*a-b* and a termination panel or marshalling cabinet 122. Each of the field junction boxes 120*a-b* routes signals from respective ones of the field devices 112*a-c* and 116*a-c* to the marshalling cabinet 122. The marshalling cabinet 122, in turn, marshals (e.g., organizes, groups, etc.) information received from field devices 112*a-c* and 116*a-c* and routes the field device information to respective I/O cards (e.g., I/O cards 132*a-b* and 134*a-b*) of the controller 104. In the illustrated example, the communications between the controller 104 and the field devices 112*a-c* and 116*a-c* are bidirectional so that the marshalling cabinet 122 is also used to route information received from I/O cards of the controller 104 to respective ones of the field devices 112*a-c* and 116*a-c* via the field junction boxes 120*a-b*.

In the illustrated example, the field devices 112*a-c* are communicatively coupled to the field junction box 120*a* and the field devices 116*a-c* are communicatively coupled to the field junction box 120*b* via electrically conductive, wireless, and/or optical communication media. For example, the field junction boxes 120*a-b* may be provided with one or more electrical, wireless, and/or optical data transceivers to communicate with electrical, wireless, and/or optical transceivers of the field devices 112*a-c* and 116*a-c*. In the illustrated example, the field junction box 120*b* is communicatively coupled wirelessly to the field device 116*c*. In an alternative example implementation, the marshalling cabinet 122 may be omitted and signals from the field devices 112*a-c* and 116*a-c* can be routed from the field junction boxes 120*a-b* directly to the I/O cards of the controller 104. In yet another example implementation, the field junction boxes 120*a-b* may be omitted and the field devices 112*a-c* and 116*a-c* can be directly connected to the marshalling cabinet 122.

The field devices 112*a-c* and 116*a-c* may be Fieldbus compliant valves, actuators, sensors, etc., in which case the field devices 112*a-c* and 116*a-c* communicate via a digital data bus using the well-known Fieldbus communication protocol. Of course, other types of field devices and communication protocols could be used instead. For example, the field devices 112*a-c* and 116*a-c* could instead be Profibus, HART, or AS-i compliant devices that communicate via the data bus using the well-known Profibus and HART communication protocols. In some example implementations, the field devices 112*a-c* and 116*a-c* can communicate information using analog communications or discrete communications instead of digital communications. In addition, the communication protocols can be used to communicate information associated with different data types. In some examples, one or more of the field devices 112*a-c* and 116*a-c* are 2-wire field devices. In some examples, one or more of the field devices 112*a-c* and 116*a-c* are 3-wire field devices.

Each of the field devices 112*a-c* and 116*a-c* is configured to store field device identification information. The field device identification information may be a physical device tag (PDT) value, a device tag name, an electronic serial number, etc. that uniquely identifies each of the field devices 112*a-c* and 116*a-c*. In the illustrated example of FIG. 1, the field devices 112*a-c* store field device identification information in the form of physical device tag values PDT0-PDT2 and the field devices 116*a-c* store field device identification information in the form of physical device tag values PDT3-PDT5. The field device identification information may be stored or programmed in the field devices 112*a-c* and 116*a-c* by a field device manufacturer and/or by an operator or engineer involved in installation of the field devices 112*a-c* and 116*a-c*.

To route information associated with the field devices 112*a-c* and 116*a-c* in the marshalling cabinet 122, the marshalling cabinet 122 is provided with a plurality of termination modules 124*a-c* and 126*a-c* communicatively coupled to corresponding terminal blocks (e.g., the terminal blocks 206*a* of FIG. 2) on the marshalling cabinet 122. The terminal blocks provide a first physical interface (e.g., wire termination points) onto which wires from the field devices 112*a-c* and 116*a-c* may be landed, a second physical interface (e.g., a slot with electrical contacts) to hold and communicatively couple the termination modules 124*a-c* and 126*a-c*, and a third physical interface to communicatively couple the terminal blocks to the marshalling cabinet 122 and the controller 104. In this manner, communications between the controller 104, the termination modules 124*a-c* and 126*a-c*, and the field devices 112*a-c* and 116*a-c* are enabled. The termination modules 124*a-c* are configured to marshal information associated with the field devices 112*a-c* in the first process area 114 and the termination modules 126*a-c* are configured to marshal information associated with the field devices 116*a-c* in the second process area 118. As shown, the termination modules 124*a-c* and 126*a-c* are communicatively coupled to the field junction boxes 120*a-b* via respective multi-conductor cables 128*a* and 128*b* (e.g., a multi-bus cable). In an alternative example implementation in which the marshalling cabinet 122 is omitted, the termination modules 124*a-c* and 126*a-c* and corresponding terminal blocks can be installed in respective ones of the field junction boxes 120*a-b*.

The illustrated example of FIG. 1 depicts a point-to-point configuration in which each conductor (including one or more wires) in the multi-conductor cables 128*a-b* communicates information uniquely associated with a respective one of the field devices 112*a-c* and 116*a-c*. For example, the multi-conductor cable 128*a* includes a first conductor 130*a*, a second conductor 130*b*, and a third conductor 130*c*. Specifically, the first conductor 130*a* is used to form a first data bus configured to communicate information between the termination module 124*a* and the field device 112*a*, the second conductor 130*b* is used to form a second data bus configured to communicate information between the termination module 124*b* and the field device 112*b*, and the third conductor 130*c* is used to form a third data bus configured to communicate information between the termination module 124*c* and the field device 112*c*. In an alternative example implementation using a multi-drop wiring configuration, each of the termination modules 124*a-c* and 126*a-c* can be communicatively coupled with one or more field devices. For example, in a multi-drop configuration, the termination module 124*a* can be communicatively coupled to the field device 112*a* and to another field device (not shown) via the first conductor 130*a*. In some example implementations, a termination module can be configured to communicate wirelessly with a plurality of field devices using a wireless mesh network. In some examples, where the field devices 112*a-c* are 3-wire field devices, the multi-conductor cable 128*a* includes additional conductors to transmit power to the field device 112*a-c*.

Each of the termination modules 124*a-c* and 126*a-c* may be configured to communicate with a respective one of the field devices 112*a-c* and 116*a-c* using a different data type. For example, the termination module 124*a* may include a digital field device interface to communicate with the field device 112*a* using digital data while the termination module 124*b* may include an analog field device interface to communicate with the field device 112*b* using analog data.

To control I/O communications between the controller 104 (and/or the workstation 102) and the field devices 112*a-c* and 116*a-c*, the controller 104 is provided with the plurality of I/O cards 132*a-b* and 134*a-b*. In the illustrated example, the I/O cards 132*a-b* are configured to control I/O communications between the controller 104 (and/or the workstation 102) and the field devices 112*a-c* in the first process area 114, and the I/O cards 134*a-b* are configured to control I/O communications between the controller 104 (and/or the workstation 102) and the field devices 116*a-c* in the second process area 118.

In the illustrated example of FIG. 1, the I/O cards 132*a-b* and 134*a-b* reside in the controller 104. To communicate information from the field devices 112*a-c* and 116*a-c* to the workstation 102, the I/O cards 132*a-b* and 134*a-b* communicate the information to the controller 104 and the controller 104 communicates the information to the workstation 102. Similarly, to communicate information from the workstation 102 to the field devices 112*a-c* and 116*a-c*, the workstation 102 communicates the information to the controller 104, the controller 104 then communicates the information to the I/O cards 132*a-b* and 134*a-b*, and the I/O cards 132*a-b* and 134*a-b* communicate the information to the field devices 112*a-c* and 116*a-c* via the termination modules 124*a-c* and 126*a-c*. In an alternative example implementation, the I/O cards 132*a-b* and 134*a-b* can be communicatively coupled to the LAN 106 internal to the controller 104 so that the I/O cards 132*a-b* and 134*a-b* can communicate directly with the workstation 102 and/or the controller 104.

To provide fault tolerant operations in the event that either of the I/O cards 132*a* and 134*a* fails, the I/O cards 132*b* and 134*b* are configured as redundant I/O cards. That is, if the I/O card 132*a* fails, the redundant I/O card 132*b* assumes control and performs the same operations as the I/O card 132*a* would otherwise perform. Similarly, the redundant I/O card 134*b* assumes control when the I/O card 134*a* fails.

To enable communications between the termination modules 124*a-c* and the I/O cards 132*a-b* and between the termination modules 126*a-c* and the I/O cards 134*a-b*, the termination modules 124*a-c* are communicatively coupled to the I/O cards 132*a-b* via a first universal I/O bus 136*a* and the termination modules 126*a-c* are communicatively coupled to the I/O cards 134*a-b* via a second universal I/O bus 136*b*. Unlike the multi-conductor cables 128*a* and 128*b*, which use separate conductors or communication mediums for each one of the field devices 112*a-c* and 116*a-c*, each of the universal I/O buses 136*a-b* is configured to communicate information corresponding to a plurality of field devices (e.g., the field devices 112*a-c* and 116*a-c*) using the same communication medium. For example, the communication medium may be a serial bus, a two-wire communication medium (e.g., twisted-pair), an optical fiber, a parallel bus, etc. via which information associated with two or more field devices can be communicated using, for example, packet-based communication techniques, multiplexed communication techniques, etc.

The universal I/O buses 136*a* and 136*b* are used to communicate information in substantially the same manner. In the illustrated example, the I/O bus 136*a* is configured to communicate information between the I/O cards 132*a-b* and the termination modules 124*a-c*. The I/O cards 132*a-b* and the termination modules 124*a-c* use an addressing scheme to enable the I/O cards 132*a-b* to identify which information corresponds to which one of the termination modules 124*a-c* and to enable each of the termination modules 124*a-c* to determine which information corresponds to which of the field devices 112*a-c*. When a termination module (e.g., one of the termination modules 124*a-c* and 126*a-c*) is connected to one of the I/O cards 132*a-b* and 134*a-b*, that I/O card automatically obtains an address of the termination module (from, for example, the termination module) to exchange information with the termination module. In this manner, the termination modules 124*a-c* and 126*a-c* can be communicatively coupled anywhere on the respective buses 136*a-b* without having to manually supply termination module addresses to the I/O cards 132*a-b* and 134*a-b* and without having to individually wire each of the termination modules 124*a-c* and 126*a-c* to the I/O cards 132*a-b* and 134*a-b*.

By providing the termination modules 124*a-c* and the termination modules 126*a-c* that can be configured to use different data type interfaces (e.g., different channel types) to communicate with the field devices 112*a-c* and 116*a-c* and that are configured to use respective common I/O buses 136*a* and 136*b* to communicate with the I/O cards 132*a-b* and 134*a-b*, the illustrated example of FIG. 1 enables routing data associated with different field device data types (e.g., the data types or channel types and corresponding communication protocols used by the field devices 112*a-c* and 116*a-c*) to the I/O cards 132*a-b* and 134*a-b* without having to implement a plurality of different field device interface types on the I/O cards 132*a-b* and 134*a-b*. Therefore, an I/O card having one interface type (e.g., an I/O bus interface type for communicating via the I/O bus 136*a* and/or the I/O bus 136*b*) can communicate with a plurality of field devices having different field device interface types.

In the illustrated example, the I/O card 132*a* includes a data structure 133 and the I/O card 134*a* includes a data structure 135. The data structure 133 stores the field device identification numbers (e.g., field device identification information) corresponding to field devices (e.g., the field devices 112*a-c*) that are assigned to communicate with the I/O card 132*a* via the universal I/O bus 136*a*. The termination modules 124*a-c* can use the field device identification numbers stored in the data structure 133 to determine whether a field device is incorrectly connected to one of the termination modules 124*a-c*. The data structure 135 stores the field device identification numbers (e.g., field device identification information) corresponding to field devices (e.g., the field devices 116*a-c*) that are assigned to communicate with the I/O card 134*a* via the universal I/O bus 136*b*. The data structures 133 and 135 can be populated by engineers, operators, and/or users via the workstation 102 during a configuration time or during operation of the example process control system 100. Although not shown, the redundant I/O card 132*b* stores a data structure identical to the data structure 133 and the redundant I/O card 134*b* stores a data structure identical to the data structure 135. Additionally or alternatively, the data structures 133 and 135 can be stored in the workstation 102.

In the illustrated example, the marshalling cabinet 122 is shown located in a termination area 140 separate from the process control area 110. By using the I/O buses 136*a-b* instead of substantially more communication media (e.g., a plurality of communication buses, each uniquely associated with one of the field devices 112*a-c* and 116*a-c* or a limited group of them along a multi-drop segment) to communicatively couple the termination modules 124*a-c* and 126*a-c* to the controller 104 facilitates locating the controller 104 relatively farther from the marshalling cabinet 122 than in known configurations without substantially decreasing the reliability of communications. In some example implementations, the process control area 110 and the termination area 140 can be combined so that the marshalling cabinet 122 and the controller 104 are located in the same area. In any case, placing the marshalling cabinet 122 and the controller 104 in areas separate from the process areas 114 and 118 enables isolating the I/O cards 132*a-b* and 134*a-b*, the termination modules 124*a-c* and 126*a-c* and the universal I/O buses 136*a-b* from harsh environmental conditions (e.g., heat, humidity, electromagnetic noise, etc.) that may be associated with the process areas 114 and 118. In this manner, the cost and complexity of designing and manufacturing the termination modules 124*a-c* and 126*a-c* and the I/O cards 132*a-b* and 134*a-b* can be substantially reduced relative to the cost of manufacturing communications and control circuitry for the field devices 112*a-c* and 116*a-c* because the termination modules 124*a-c* and 126*a-c* and the I/O cards 132*a-b* and 134a-b do not require operating specification features (e.g., shielding, more robust circuitry, more complex error checking, etc.) required to guarantee reliable operation (e.g., reliable data communications) as would otherwise be necessary to operate in the environmental conditions of the process areas 114 and 118.

Additional details and alternative example implementations that may be used to communicatively couple workstations, controllers, and I/O cards, as well as additional details and alternative example implementations of the example marshalling cabinet 122 and termination modules 124a-c and 126a-c are disclosed in U.S. Pat. Nos. 8,332,567; 8,762,618; 9,495,313; and 9,411,769; all of which were incorporated above.

Figure 2:
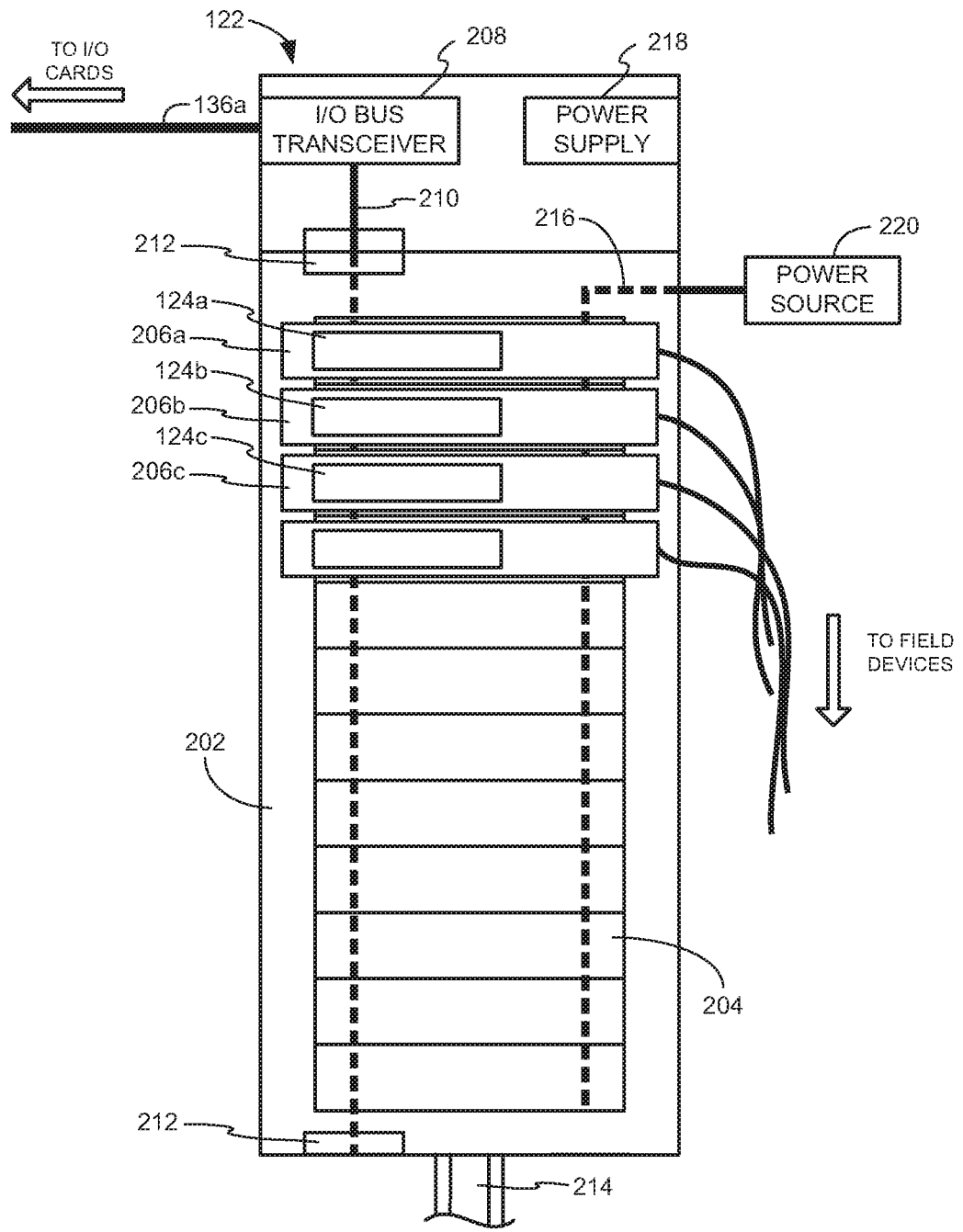
FIG. 2 is a detailed diagram of the example marshalling cabinet of FIG. 1.

FIG. 2 is a detailed diagram of the example termination panel or marshalling cabinet 122 of FIG. 1. In the illustrated example, the marshalling cabinet 122 includes a baseplate 202 that is provided with a socket rail 204. The socket rail 204 of the illustrated example is structured to receive terminal blocks 206a-c to which the termination modules 124a-c may be communicatively coupled. In addition, the marshalling cabinet 122 is provided with an I/O bus transceiver 208 that communicatively couples the termination modules 124a-c to the universal I/O bus 136a described above in connection with FIG. 1. The I/O bus transceiver 208 may be implemented using a transmitter amplifier and a receiver amplifier that conditions signals exchanged between the termination modules 124a-c and the I/O cards 132a-b. The marshalling cabinet 122 is provided with another universal I/O bus 210 communicatively coupling the terminal modules 124a-c (via the terminal blocks 206a-c) to the I/O bus transceiver 208. In some examples, multiple baseplates 202 may be communicatively coupled to enable additional termination modules to be communicatively coupled to the I/O transceiver 208. In some such examples, the baseplates are provided with connectors 212 to interconnect the I/O bus 210 across each baseplate 202 as successive baseplates 202 are attached to an underlying support frame 214 (e.g., a DIN rail).

Using a common communication interface (e.g., the I/O bus 210 and the I/O bus 136a) to exchange information between the I/O cards 132a-b and the termination modules 124a-c enables defining field device-to-I/O card connection routing late in a design or installation process. For example, the termination modules 124a-c can be communicatively coupled to the I/O bus 210 at various locations (e.g., various terminal blocks 206a-c in different sockets of the socket rail 204) within the marshalling cabinet 122. In addition, the common communication interface (e.g., the I/O bus 210 and the I/O bus 136a) between the I/O cards 132a-b and the termination modules 124a-c reduces the number of communication media (e.g., the number of communication buses and/or wires) between the I/O cards 132a-b and the termination modules 124a-c, thus enabling installation of relatively more of the termination modules 124a-c (and/or the termination modules 126a-c) in the marshalling cabinet 122 than the number of known termination modules that can be installed in known marshalling cabinet configurations.

To provide electrical power to the termination modules 124a-c and the I/O bus transceiver 208, the marshalling cabinet 122 is provided with a power supply 218. In some examples, the termination modules 124a-c use the electrical power from the power supply 218 to power communication channels or communication interfaces used to communicate with field devices (e.g., the field devices 112a-c of FIG. 1) and/or to provide the field devices electrical power for operation. Additionally or alternatively, in some examples as shown in the FIG. 2, each baseplate 202 is provided with a local power bus 216 that may be connected to an external power source 220. The external power source 220 may be any suitable power source such as 24 volts direct current (VDC) or 120/230 volts alternating current (VAC). In some examples, the termination modules 124a-c use the electrical power from the external power source 220 to power communication channels or communication interfaces and/or to provide power to the field devices for operation. Providing power through the local power bus 216 in this manner eliminates the need to separately wire each 3-wire field devices requiring such power to an external power source. The cost of implementing the control system is reduced as a result of less time being needed to wire and maintain the system in addition to the costs saved from fewer components. In the illustrated example, although the termination modules 124a-c may use power from either the internal power supply 218 or the external power source 220, in either case, communications with the I/O cards 132a-b are still achieved via the I/O bus transceiver 208 over the I/O bus 210. Whether the termination modules 124a-c use power from the internal power supply 218 or the external power source 220 depends upon the type or configuration of the terminal block used to interface the termination modules 124a-c with the baseplate 202. That is, in some examples, the terminal block 206a is provided with a plurality of connectors (e.g., the baseplate connectors 310 of FIG. 3B) to electrically couple the terminal block 206a to the baseplate 202. In some examples, at least one of the connectors directly couples the termination module 124a to the local power bus 216 of the baseplate 202 (to provide power) while at least one other connector directly couples the termination module 124a to the universal I/O bus 210 of the baseplate 202 (to enable communications).

Figure 3A:
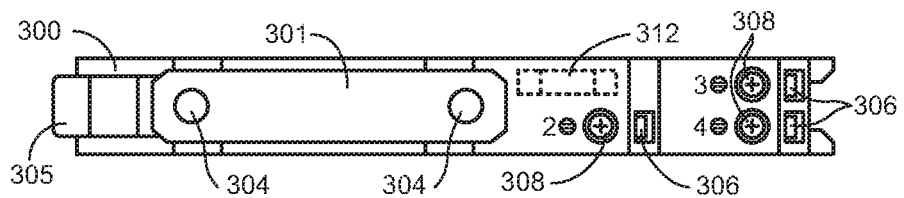
FIGS. 3A-3C depict top, side, and end views, respectively, of the example terminal block constructed in accordance with the teachings disclosed herein.
Figure 3B:
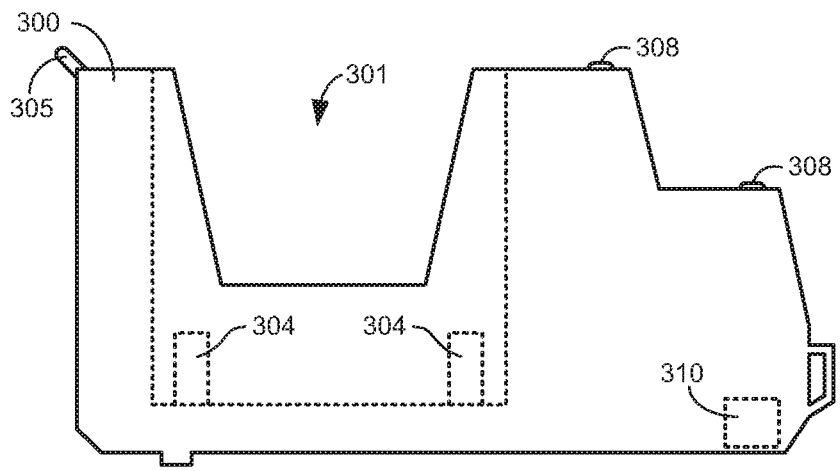
Figure 3C:
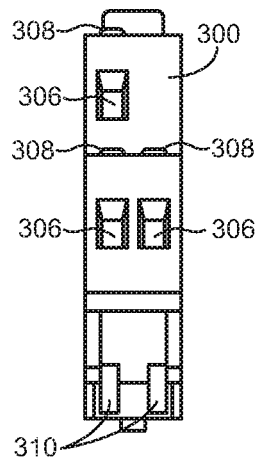
Figure 4:
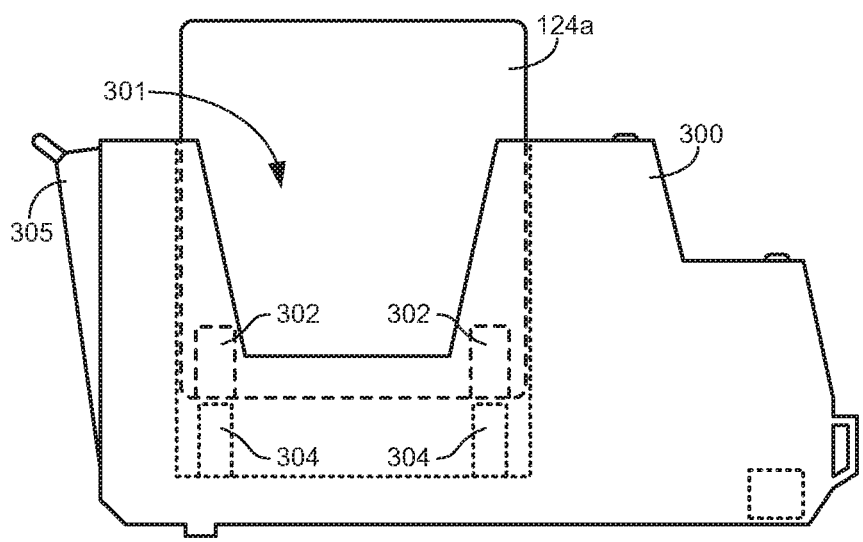
FIG. 4 is a side view of the example terminal block of FIGS. 3A-3C with the example termination module of FIGS. 1 and 2 partially inserted therein.

FIGS. 3A-3C depict a top view, a side view, and an end view, respectively, of the example terminal block 300, which may be similar or identical to the terminal blocks 206a-c of FIG. 2. FIG. 4 depicts a side view of the example terminal block 300 of FIGS. 3A-3C with the example termination module 124a of FIGS. 1 and 2 partially inserted into a slot 301 of the terminal block 300. As shown in the illustrated example of FIG. 4, the termination module 124a is removably coupled to the terminal block 300 via the slot 301. More particularly, the example termination module 124a includes a plurality of contacts 302 that communicatively couple and/or electrically couple the termination module 124a to corresponding contacts 304 of the terminal block 300 when the termination module 124a is inserted into the slot 301 of the terminal block 300. In this manner, the termination module 124a can be selectively removed and/or coupled to the termination block 300 while the termination block 300 is in place and coupled to the baseplate 202 (FIG. 2) and/or communicatively coupled with a field device. In some examples, the terminal block 300 includes a moveable latch 305 that either releases the termination module 124a or secures the termination module 124a in an installed position when the contacts 304 of terminal bock 300 are electrically coupled to the contacts 302 of the termination module 124a. Additionally or alternatively, in some examples, the latch 305 selectively secures the termination module 124a in a partially installed position. In the partially installed position, the termination module 124a is held in place within the slot 301 while preventing electrical contact between contacts 302, 304 of the termination module 124a and the terminal block 300 (similar to what is shown in FIG. 4). In this manner, wiring to a field device may be decoupled from the control system to facilitate maintenance or to remove power to the field device (e.g., provided from the external power source 220 of FIG. 2).

In some examples, to communicatively couple the termination module 124a to the universal I/O bus 210 of FIG. 2, the terminal block 300 is provided with a plurality of baseplate connectors 310. As described above, in some examples, at least one of the baseplate connectors 310 couples the termination module 124a to the universal I/O bus 210 while at least one other baseplate connector 310 couples the termination module 124a to the local power bus 216 to provide power to the termination module 124a and the associated field device from the external power source 220. That is, unlike some known terminal blocks where all connectors to the baseplate 202 directly couple the universal I/O bus 210 with a termination module, the terminal block 300 of the illustrated example provides separate connections to each of the universal I/O bus 210 and the local power bus 216. The baseplate connectors 310 may be implemented using any suitable interface including, for example, an insulation piercing connector, a knife connector, etc. In this manner, the termination module 124a can enable both communications to the I/O bus 210 and power delivery to a corresponding field device. More particularly, to enable communicating information between the termination module 124a and the I/O bus 210, the baseplate connectors 310 coupled to the I/O bus 210 are also internally connected to one or more of the contacts 302 of the termination module 124a. Likewise, to enable power transmission between the termination module 124a and the field device, the baseplate connectors 310 coupled to the local power bus 216 are also internally connected to one or more different ones of the contacts 302 of the termination module 124a.

In some examples, the terminal block 300 is provided with a field device interface such as wire termination points 306 to secure (e.g., via moveable cage clamps actuated by screws 308) conductive communication media (e.g., a bus wire) from a field device (e.g., the field device 112a of FIG. 1). More particularly, in some examples, the field device 112a is a 3-wire DI field device. In some such examples, each of the three wire termination points 306 of the terminal block 300 is to receive one of the three wires from the 3-wire field device. When the termination module 124a is removably coupled to the terminal block 300, the termination points 306 are communicatively coupled to one or more of the contacts 302 of the termination module 124a to enable communicating information between the termination module 124a and the field device 112a. Additionally, in some examples, the termination points 306 are communicatively coupled to one or more of the contacts 302 to enable power transmission between the termination module 124a and the field device 112a based on power from the external power source 220.

In other example implementations, the terminal block 300 may be provided with any other suitable type of field device interface (e.g., a socket) instead of the termination screws 308. In addition, although one field device interface (e.g., the termination points 306 with the screws 308) is shown, the terminal block 300 may be provided with more field device interfaces configured to enable communicatively coupling a plurality of field devices to the termination module 124a.

With the example termination block 300 electrically coupled to the local power bus 216, there is the possibility that a short circuit associated with the corresponding termination module 124a and corresponding field device may occur and draw away power from other termination modules in other terminal blocks on the baseplate 202. Accordingly, in the illustrated example, the termination block 300 is provided with a fuse 312 to protect other termination modules (in other terminal blocks) from losing power. In some examples, the fuse is replaceable. In this manner, the cost of acquiring and wiring a separate external fuse is eliminated. Furthermore, incorporating the fuse 312 into the terminal block 300 reduces the overall footprint of the system.

Figure 5:
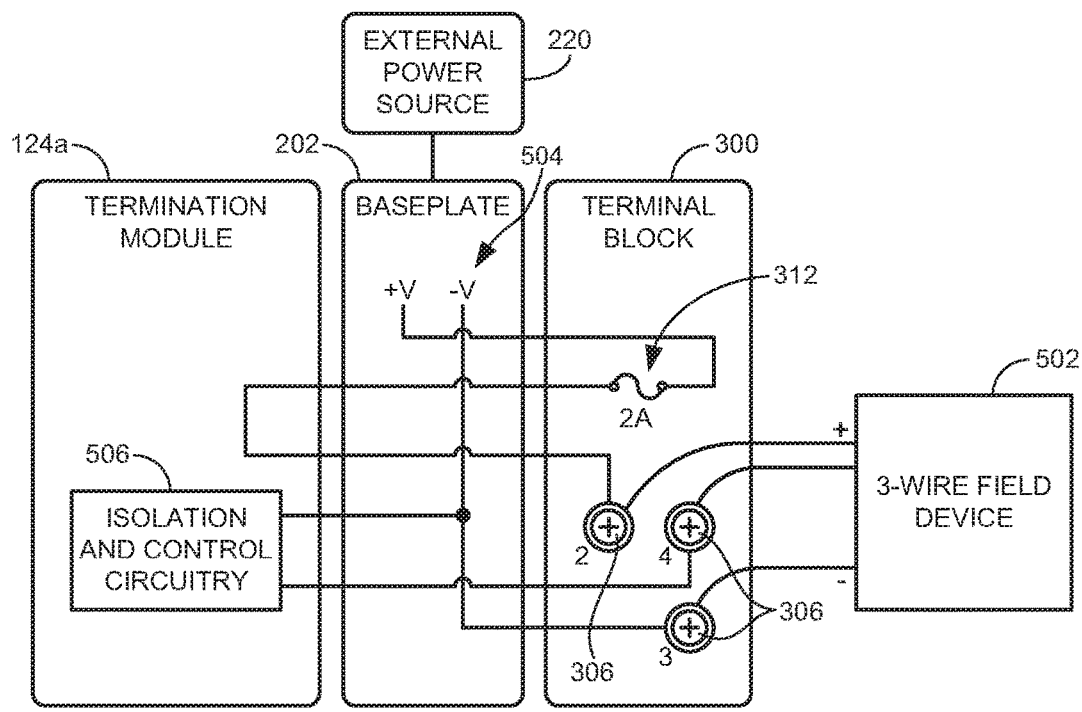
FIG. 5 is a schematic diagram of an example wiring of a 3-wire field device to the example terminal block of FIGS. 3 and 4 installed within the example marshalling cabinet of FIGS. 1 and 2.

FIG. 5 is a schematic illustration of an example implementation of the example terminal block 300 of FIGS. 3 and 4 wired to a 3-wire field device 502 (e.g., corresponding to the field device 112a of FIG. 1). In some examples, the field device 502 is a discrete input (DI) field device, such as, for example, photoelectric or capacitive sensors, switches, or other such DI devices that need power to operate. In the illustrated example, the terminal block 300 is communicatively coupled to the baseplate 202 that provides power 504 from the external power source 220. Further, in the illustrated example of FIG. 5, the terminal block 300 is communicatively coupled to the termination module 124a that provides isolation and control circuitry 506 to enable communications between the field device 502 and the controller 104 (FIG. 1) as described more fully in U.S. Pat. Nos. 8,332,567; 8,762,618; 9,495,313; and 9,411,769; all of which were incorporated above.

As shown in the illustrated example of FIG. 5, each of the three wires of the field device 502 is landed directly onto one of the three termination points 306 of the terminal block 300. Signaling and electrical power delivery are accomplished through the internal wiring and design of the terminal block 300 (including the baseplate connectors 310) in relation to the termination module 124a and the baseplate 202 (that may be coupled to the external power source 220). Furthermore, in some examples, the terminal block 300 includes the fuse 312 built into the terminal block 300 between the termination points 306 and the baseplate 202 (through which power is provided) to provide short circuit protection.

Figure 6:
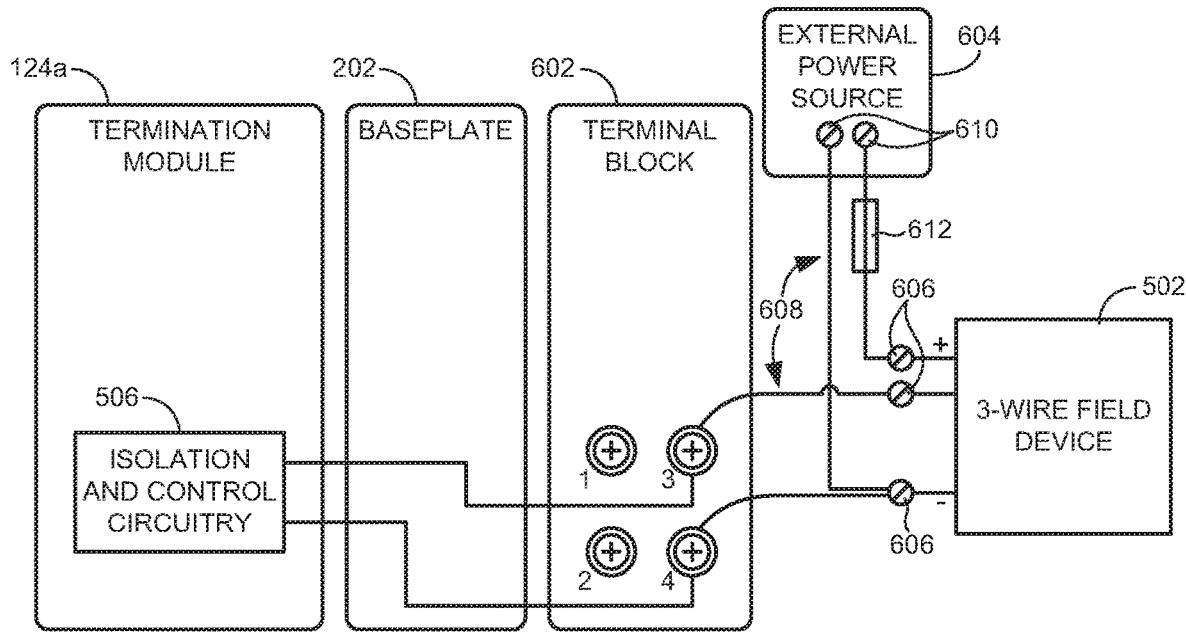
FIG. 6 is a schematic diagram of a wiring of the 3-wire field device of FIG. 5 to a known terminal block installed within the example marshalling cabinet of FIGS. 1 and 2.

For purposes of comparison, FIG. 6 illustrates a schematic implementation of the 3-wire DI field device 502 wired to the termination module 124a using a known terminal block 602 constructed to handle common 2-wire architectures. As described above, to implement a 3-wire field device, there is the need for an external power source. Unlike the illustrated example of FIG. 5, the terminal block 602 of FIG. 6 is not equipped to provide power through the baseplate 202. As a result, an external power source 604 must be separately coupled to the 3-wire field device 502. In such scenarios, interfacing the 3-wire field device 502 with both the external power source 604 and the terminal block 602 may require three intermediate terminals 606. Furthermore, additional wires 608 may be required to land on the terminal block 602 and to electrically couple to the external power source 604 via two additional terminals 610. Further still, with the external power source 604 wired in, there is also a need for an external fuse 612 to protect against short circuits. Each of the terminals 606, 610, the wires 608, and the fuse 612 shown in FIG. 6 are additional and separate components adding to the cost and complexity to a control system that may be avoided using the example terminal block 300 shown in FIG. 5. Furthermore, the example implementation shown in FIG. 5 has a much smaller footprint than what is shown in FIG. 6 because the additional components are either excluded or incorporated within the terminal block 300.

Although the external power source 220 still needs to be wired to the baseplate 202 to provide power in the illustrated example of FIG. 5, in some examples, this wiring only needs to be performed once for all field devices communicatively coupled to the baseplate 202. In some examples, the baseplate 202 holds up to twelve terminal blocks and corresponding termination modules. By contrast, using known techniques, as shown in FIG. 6, each additional 3-wire field device would need to be separately coupled to the external power source 604, thereby further increasing the cost and complexity of setting up and maintaining the control system.

Figure 7:
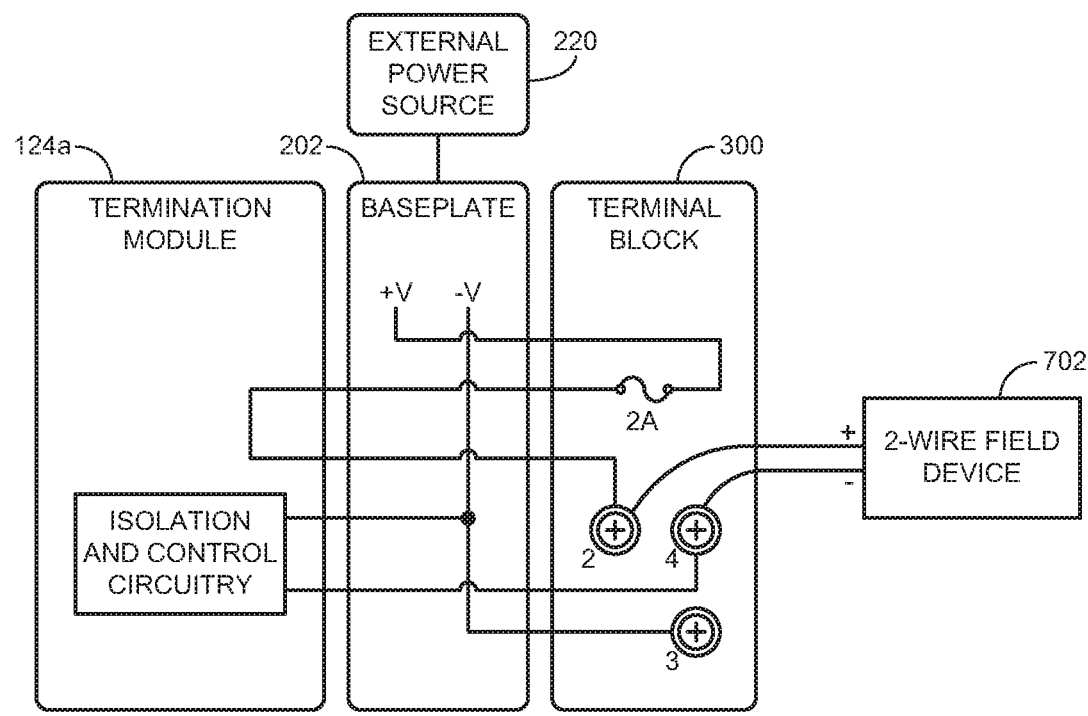
FIG. 7 is a schematic diagram of an example wiring of a 2-wire field device to the example terminal block of FIGS. 3 and 4 installed within the example marshalling cabinet of FIGS. 1 and 2.

FIG. 7 is a schematic illustration of an example implementation of the example terminal block 300 of FIGS. 3 and 4 wired to a 2-wire field device 702 (e.g., which may be similar or identical to the field device 112*a* of FIG. 1). While the terminal block 300 may be advantageously employed to communicatively couple a 3-wire field device as shown in FIG. 5, in some examples, the terminal block 300 may also be used to communicatively couple with a common 2-wire field device as illustrated in FIG. 7. In some examples, the 2-wire field device 702 is powered via the external power source 220. As a result, the example terminal block 300 disclosed herein may be used to communicatively coupled either a 2-wire field device or a 3-wire field device to a process control system.

Although certain example apparatus have been disclosed herein, the scope of coverage of this patent is not limited thereto. On the contrary, this patent covers all methods, apparatus and articles of manufacture fairly falling within the scope of the claims of this patent.

What is claimed is:

1. A terminal block, comprising:
   a first interface including termination points to couple with a field device;
   a second interface to be removably coupled with a shared bus of a termination panel, wherein the terminal block is to be removably coupled to the shared bus;
   a third interface to couple with a power bus of the termination panel; and
   a fuse disposed between the first interface and the third interface.

2. The terminal block of claim 1, wherein the second interface removably receives a first termination module to communicate with the field device via the first interface using a first communication protocol.

3. The terminal block of claim 2, wherein the first termination module communicates with a controller via the shared bus using a second communication protocol different than the first communication protocol.

4. The terminal block of claim 2, wherein the second interface removably receives a second termination module in place of the first termination module to communicate with a second field device via the first interface using a second communication protocol different than the first communication protocol.

5. The terminal block of claim 2, wherein the first termination module is replaceable with a second termination module while the first interface is communicatively coupled to the field device.

6. The terminal block of claim 2, wherein the first termination module is replaceable with a second termination module while the second interface is communicatively coupled to the shared bus.

7. The terminal block of claim 2, further including a moveable latch that releases the first termination module, secures the first termination module in an installed position, or secures the first termination module in a partially installed position.

8. The terminal block of claim 7, wherein the partially installed position corresponds to the first termination module being held in place within a slot of the terminal block while preventing electrical contact between contacts of the first termination module and the second interface.

9. The terminal block of claim 1, wherein the power bus provides power to the field device from an external power source, the power bus separate from the shared bus.

10. The terminal block of claim 1, wherein the field device is at least one of a two-wire field device, a two-wire discrete input field device, a three-wire field device, or a three-wire discrete input field device.

11. The terminal block of claim 1, wherein the fuse is removably coupled to the third interface.

12. A termination panel, comprising:
    a shared bus;
    a power bus;
    a plurality of terminal blocks to couple with a controller via the shared bus, at least a first one of the terminal blocks including:
    a first interface including termination points to couple with a field device;
    a second interface to be removably coupled with the shared bus, wherein the first one of the terminal blocks is to be removably coupled to the shared bus;
    a third interface to couple with the power bus; and
    a fuse disposed between the first interface and the third interface.

13. The termination panel of claim 12, wherein the first terminal block is coupled to an I/O card included in the controller via the shared bus.

14. The termination panel of claim 12, wherein the I/O card is a first I/O card and the shared bus is a first shared bus, further including a second one of the terminal blocks coupled to a second I/O card included in the controller via a second shared bus different than the first shared bus.

15. The termination panel of claim 12, wherein the power bus provides power to the field device from an external power source, the power bus separate from the shared bus.

16. The termination panel of claim 12, wherein the fuse is removably coupled to the third interface.

17. The termination panel of claim 12, further including disposing the termination panel in a marshalling cabinet.

18. A process control system, comprising:
    a controller;
    a termination panel including a shared bus and a power bus, the termination panel including:
    a plurality of terminal blocks coupled to the termination panel to couple with the controller via the shared bus, at least a first one of the terminal blocks including:
    a first interface including termination points to couple with a field device;
    a second interface to be removably coupled with the shared bus, wherein the first one of the terminal blocks is to be removably coupled to the shared bus;
    a third interface to couple with the power bus; and
    a fuse disposed between the first interface and the third interface.

19. The process control system of claim 18, wherein the second interface removably receives a first termination module to communicate with the field device via the first interface using a first communication protocol.

20. The process control system of claim 19, wherein the controller is communicatively coupled to the first termination module via the second interface using a second communication protocol different than the first communication protocol, and further including a workstation communicatively coupled to the controller using a third communication protocol different than the first and second communication protocols.

\* \* \* \* \*